United States Patent [19]

Thornburg et al.

[11] Patent Number: 4,570,149

[45] Date of Patent: Feb. 11, 1986

[54] SIMPLIFIED TOUCH TABLET DATA DEVICE

[75] Inventors: David D. Thornburg; George M. White, III, both of Los Altos, Calif.

[73] Assignee: Koala Technologies Corporation, Santa Clara, Calif.

[21] Appl. No.: 475,419

[22] Filed: Mar. 15, 1983

[51] Int. Cl.⁴ .......................................... G08C 21/00
[52] U.S. Cl. ...................................... 338/114; 338/99; 178/18; 178/20
[58] Field of Search ................... 338/114, 115, 89–91, 338/99–102; 178/18, 19, 20; 33/1 M

[56] References Cited

U.S. PATENT DOCUMENTS

| | | | |
|---|---|---|---|
| 3,593,115 | 7/1971 | Dym et al. | 178/19 X |
| 3,662,105 | 5/1972 | Harst et al. | 178/19 X |
| 4,079,194 | 3/1978 | Kley | 178/18 |
| 4,126,760 | 11/1978 | Gordon | 178/18 |
| 4,149,029 | 4/1979 | Pobgee | 178/18 |
| 4,208,648 | 6/1980 | Naumann | 338/99 |
| 4,289,925 | 9/1981 | Lambden | 178/18 |
| 4,319,078 | 3/1982 | Yokoo et al. | 340/365 A |
| 4,444,998 | 4/1984 | House | 338/114 X |

FOREIGN PATENT DOCUMENTS 1120526  7/1968  United Kingdom ................... 178/20

OTHER PUBLICATIONS

Hevesi, "Analog Data Tablet", IBM Technical Disclosure vol. 23, No. 2, Jul. 1980 pp. 666–667.

Primary Examiner—Philip W. Leung
Assistant Examiner—C. N. Sears
Attorney, Agent, or Firm—Alan H. MacPherson; Steven F. Caserza; Richard Franklin

[57] ABSTRACT

A touch tablet is provided containing two sheets of insulating material each of which contains a plurality of spaced apart conductive lines. A resistive strip on each sheet contacts and connects electrically one end of each of the plurality of conductive lines on that sheet. Each resistive strip functions as a potentiometer. Mounted between the two sheets and spaced apart therefrom is a conductive middle sheet. The first and second sheets are mounted such that the first and second sets of a plurality of conductive lines on these sheets are orthogonal to each other. A user presses on one of the two sheets to bring all three sheets into contact. The impedence of each potentiometer is a function of the contact point. The potentiometer is used as part of an RC circuit to provide a variable time constant representative of the coordinate of the contact point.

2 Claims, 13 Drawing Figures

FIG.5a
PRIOR ART
BLOCK DIAGRAM FOR
TYPICAL INTERFACE
TO ANALOG PANELS

FIG.5b
PRIOR ART
TYPICAL SWITCHING
NETWORK

FIG. 5c
PRIOR ART
STATIC EQUIVALENT CIRCUIT

FIG. 5d
PRIOR ART

TYPICAL DIGITIZING CIRCUIT
FOR ANALOG PANELS

FIG. 6
TABLET SUPPLIES TWO VARIABLE
RESISTOR OUTPUTS TO COMPUTER
INPUT CHANNEL

FIG. 7
SHEET OF FLEXIBLE INSULATOR (MYLAR)
COATED WITH HORIZONTAL CONDUCTIVE (SILVER)
LINES THAT TAP INTO A VERTICAL RESISTOR
(CARBON INK LINE)

FIG.8
COMPLETE TABLET ASSEMBLY

FIG.9
ALTERNATE DESIGN FOR COMPLETE TABLET

SIMPLIFIED TOUCH TABLET DATA DEVICE

BACKGROUND OF THE INVENTION

1. Field of the Invention

This invention relates to structure for the entry of data into a computer or a graphics display device and in particular to a tablet which is capable of translating the particular position touched on the tablet to digital representation of the X and Y coordinates of that position.

2. Prior Art

A number of different devices have been proposed for controlling the movement of a cursor upon a visual display. Among the various cursor controls suggested is a structure comprising four sets of switches, each controlling cursor movement in one of four orthogonal directions as disclosed in U.S. Pat. No. 4,313,113 on an invention of David Thornburg.

Additional structure for the entry of two dimensional graphic data into a digital system such as a communication system is disclosed in U.S. Pat. No. 4,079,194 issued Mar. 14, 1978 on an application of Kley entitled "Graphical Data Entry Pad". Kley discloses a resistive grid area to which a conductive layer may be selectively contacted so that graphical data can be generated by external electronic circuitry which measures resistance. The resistive grid area is formed by a pattern of resistive inking on a base and is separated from the conductive layer by a foamed thermal plastic insulating separator. High resistance bands surround the grid area so as to linearize its output value. The structure of the '194 patent comprises a plane rectangular resistive grid area with four edges and of moderate resistance material and a conductive layer spaced from but parallel to the resistive grid area such that the resistive grid area or the conductive layer can be displaced in the direction of the other so as to make electrical contact at a selected point. The four edges of the resistive grid area are contacted by resistive structures having an effective resistance parallel to the edges of the resistive grid area substantially higher than that of the resistive grid area. Four conductors are provided to connect on a one-to-one basis, the resistive structure connecting the edges of the resistive grid area to external circuitry for determining the X and Y coordinates of the point of contact between the resistive grid and the conductive layer. In implementing the structure, the resistive grid is separated from the conductive layer by "a large number of depending projections 24 . . . formed closely packed all along the lower surface of the top cover 12, the projections 24 extending so as to penetrate into the insulating separator 20" between the resistive grid area and the conductive material. (U.S. Pat. No. 4,079,194, Column 2, lines 23 to 26). The insulating separator 20 between the conductive layer and the resistive material is formed of an insulating thermal plastic or other resilient and flexible material of a relatively low density. Upon pressing the top cover 12, the projections 24 pass through the insulating material into contact with the resistive material on the base pad 22. In an alternative embodiment, the top cover has no depending projections 24 but rather the insulating separator 20 "is of an open-work type, being provided throughout its area with a multiplicity of openings 58 which extend therethrough." (U.S. Pat. No. 4,079,194, Column 5, lines 5 to 8). Depressing the top cover 12 causes the insulating separator 24 to compress so that the top cover 12 touches the resistive material on the top of the base pad 22 through one or more of the openings 58.

The structure disclosed by Kley has the undesirable characteristic that the X, Y coordinates of a position contacted on the cover 12 can only be determined within the accuracy of the dimensions of the projections 24 or the openings 58 in the separator 20 between the conductive material on the bottom surface of the top cover 12 and the resistive material on the top surface of the base pad 22.

Kley in U.S. Pat. No. 4,214,122 issued July 22, 1980 discloses a similar rectangular structure wherein the arrangement of conductive strips relative to the resistive grid area is selected so as to improve the linearity of the voltage gradients in the rectangular graphic area.

Additional prior art patents disclosing graphical entry devices employing rectangular resistive sheets or planes include U.S. Pat. Nos. 2,900,446, 3,304,612, 3,522,664, 3,591,718, 3,699,439, 3,798,370 and 3,806,912.

U.S. Pat. No. 3,522,664 discloses a flexible member coated with a conductive layer which is positioned above a base member which is coated with a resistive material so that the location of a point at which the two members are pressed together can be determined by measuring the resistances from the edges of the layer to the resistive material at that point. Again the output signal is less linear than desired.

Another technique for deriving X, Y position information for input into a display system is disclosed in U.S. Pat. No. 3,541,541 disclosing an indicator control mechanism for movement by hand over any surface. The mechanism generates position signals which cause a cursor displayed on a cathode ray tube to move to a corresponding position. The mechanism contains X and Y position wheels mounted perpendicular to each other which rotate according to the X and Y movements of the mechanism and which operate rheostats to send signals along a wire to the computer which controls the CRT display.

U.S. Pat. No. 3,705,956 discloses an electromagnetic sensor held in a spaced relation to a grid network having a plurality of conductors defining a Gray Code pattern. Each of the conductors corresponds to a grid in the Gray Code and the grid network is characterized by differences which correspond to the differences in the bits of the Gray Code. As current is passed sequentially through each of the conductors, a voltage is induced in the sensor. The location of the sensor with the respect to the grid network is determined by detecting the phase of the voltage induced in the sensor.

An additional structure for this purpose is disclosed in U.S. Pat. No. 3,911,215 issued Oct. 7, 1975 on an application of Hurst, et al., entitled "Discriminating Contact Sensor". The sensor comprises two juxtaposed electrical potential carrying sheets, at least one being flexible, separated from each other but permitting contact therebetween when an object of specified radius of curvature is pressed against the flexible sheet. The separation of the sheets is accomplished by discrete small buttons of insulation preferably mounted on the flexible sheet, with the spacing and the height of the buttons determining the largest radius of curvature to which the sensor will respond. Contact is made only by depression of the flexible sheet with a writing instrument and not by any portion of a writer's hand.

U.S. Pat. No. 4,319,078 issued Mar. 9, 1982 on an application of Yokoo, et al., discloses apparatus for detecting X and Y coordinates of the input points consisting of a first parallel electrode group and a second parallel electrode group opposing and perpendicular to the first parallel electrode group. A pressure conductive rubber sheet is interposed between the first and second parallel electrode groups. This sheet is rendered conductive upon application of pressure to the input surface. An electrical detector is provided to detect currents flowing through first and second resistors contacting terminal ends of the first and second parallel electrode groups, respectively.

Additional entry structures are provided from Sierracin using a membrane switch denoted as Transflex (a trademark of Sierracin). This structure comprises a film coated with a transparent electrically-conductive layer of either gold or indium tin oxide. The material is mounted on the face of a cathode ray tube and the alphanumeric displays on the tube are read through the material. The entire switch pad area is conductive and can be touched anywhere within the designated area of the graphic display to obtain a desired response.

In one product produced by Sierracin, two pieces of an insulating film are each coated on one surface with conductive layers. Each layer then is etched to form parallel isolation lines between parallel conductive lines. The two films are then mounted such that the conductive lines on the two films are orthogonal and the conductive lines on one film are separated from the conductive lines on the other film by a small air gap. Separation is accomplished through the use of edge gaskets and/or interlayers. By applying a slight pressure, the films are brought into electrical contact with each other allowing current to flow in a specific circuit. In one embodiment, the usual method of retrieving information is to alternately drive one of the sheets of the panel with either a constant voltage or current source while using the other sheet as a sensor. The resulting X and Y signals are then scaled, filtered and digitized to meet system requirements. Whether a particular output signal is from the X direction or the Y direction depends upon which sheet is used as a sensor and which is used as the input signal source. The output signal must be taken through a pull down resistor which is large in value compared to the resistance of the sheet used as the sensor.

FIGS. 5a, 5b, 5c and 5d illustrate the circuitry associated with this prior art sensing sheet.

SUMMARY OF THE INVENTION

This invention overcomes the disadvantages of the prior art graphics display input tablets by providing a touch tablet configuration which significantly reduces the impact of the impedance of the sensor sheet on the final output reading relating to the position detected by the position detecting sheet.

In accordance with one embodiment of this invention, the maximum error in the output reading is reduced to no more than one-quarter the maximum error using the prior art detection method. In accordance with this embodiment, two sheets of an insulating film are each coated on one surface with a resistive layer. Two parallel conductive bars are placed at opposite ends of the resistive layer on each sheet and the two resistive layers are then arranged such that the parallel conductive bars on one sheet are orthogonal to the parallel conductive bars on the other sheet and the two resistive layers face each other. One sheet is used to measure the x coordinate of the position being contacted and the other sheet is used to measure the y coordinate of this position. By connecting the parallel conductive bars at both ends of the resistive material in the sensor sheet to the output circuit, the sensing error is substantially reduced compared to the sensing error in the prior art.

In accordance with another embodiment of this invention, a sheet of flexible insulating material is coated with horizontal conductive lines that tap into a vertical resistor. An additional sheet is provided of identical construction but oriented orthogonal to the first sheet. The conductive and resistive materials on the two sheets are oriented facing each other but separated from each other by an insulating layer. The insulating layer has on both surfaces a conductive material. The user simultaneously enters an X and Y position by pressing on the combined sandwich of three sheets thereby to bring a conductive layer strip into contact with the conductive material on the insulating layer. The resistances sensed from the resistive strips on the two sheets of flexible insulating material by an output amplifier determine the X coordinate and the Y coordinate of the point of contact.

This invention will be more fully understood in conjunction with the following detailed description taken together with the drawings.

DETAILED DESCRIPTION

Figure 1:
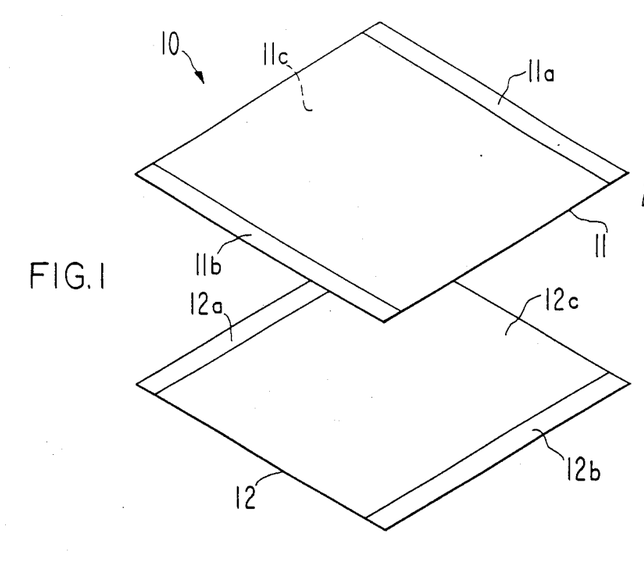
FIG. 1 shows the two sheets of material developed in accordance with this invention for use in sensing the X and Y coordinates of a contact point on the sheets.

Referring now to FIG. 1, an exploded view is shown of two sheets of conductive material suitable for use in this invention. The structure 10 of FIG. 1 comprises a top sheet 11 suitable for use in measuring one coordinate of a point being touched on the sheet and a second sheet 12 suitable for measuring the other coordinate of the point being touched. Sheet 11 comprises in the preferred embodiment a Mylar sheet approximately three to seven mils thick and preferably of 5 mils thickness. Formed on the center portion of the Mylar sheet 11 is a graphite ink surface 11c having a sheet resistivity of approximately 300 ohms per square. On two of the four edges of the sheet are formed conductive bars 11a and 11b of an extremely low resistance such that conductive bar 11a is substantially equipotential as is conductive bar 11b. Conductive bars 11a and 11b are formed of a silver ink in a manner well known in the art. Bottom sheet 12 similarly has formed on center portion 12c a graphite ink resistive surface having a sheet resistivity of approximately 300 ohms per square. Conductive bars 12a and 12b are formed on two of the four edges of sheet 12 of a silver ink such that each bar is substantially equipotential and has extremely small resistance to the flow of current.

Sheets 11 and 12 are stretched over a square frame in the X and Y directions to leave an air space of approximately ten (10) to thirty (30) mils between the two sheets. The conductive graphite surface over region 11c is arranged to be in direct electrical contact with the conductive graphite surface 12c when sheet 11 is depressed into contact with sheet 12. The air space is selected in such a manner as to ensure that the sheets do not come into contact on their own accord and that the force required to bring one sheet into contact with the other over its active surface does not exceed a selected magnitude, typically five (5) ounces. Naturally, the air gap can become larger as the size of the tablet is increased.

Figure 2A:
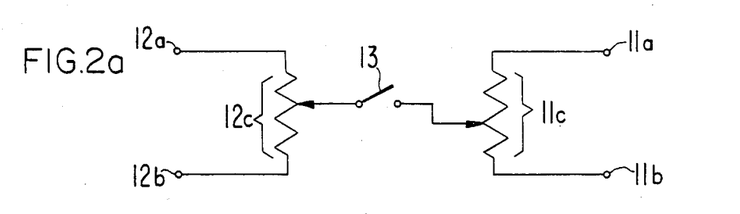
FIGS. 2a and 2b, respectively, illustrate schematically the electrical relationship of the two sheets of FIG. 1 when a point on one sheet is in contact with a point on the other sheet as illustrated by the closing of switch 13, and the basic circuit schematic in accordance with this invention which allows the position of contact in one coordinate (illustrated as the X coordinate) to be determined at a given time.

In FIG. 2a the electrical contact between sheets 11 and 12 is illustrated schematically by means of switch 13 which can be either opened (no contact) or closed to indicate contact between surface 11c and surface 12c. The point at which contact is made between the two surfaces determines the X and Y coordinates of the contact point. Contact is made conventionally by pressing the two sheets together.

Figure 2B:
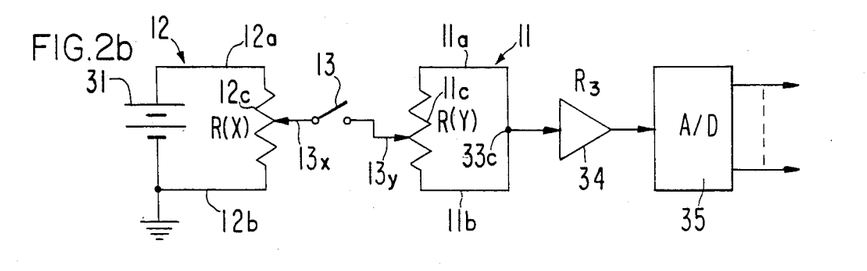

FIG. 26 illustrates the electrical connections to sheets 11 and 12 to allow one or the other of the X and Y coordinates of the point of contact between the two sheets to be determined. As shown in FIG. 2b, sheet 12 (corresponding to sheet 12 in FIG. 1) is used to measure the X coordinate of the contact point and sheet 11 (corresponding to sheet 11 in FIG. 1) is used to measure the Y coordinate of this point. However, only one measurement can be made at a time. Thus when sheet 12 is being used to measure the X coordinate, sheet 11 serves as a sensor merely to contact sheet 12 and conduct current representative of the X coordinate of the point of contact from sheet 12 to an amplifier 34 (FIG. 2b). From amplifier 34 this signal is sent to an analog-to-digital convertor 35 to allow the voltage detected on sheet 12 by the sensor sheet 11 to be converted into digital information representative of the X coordinate of the position of the contact point. Thus the closure of switch 13 due to contact between the conductive surface 11c and the conductive surface 12c results in current flowing from battery 31 through resistor R(X) comprising the resistive surface 12c. This current creates a voltage drop through resistor R(X). Contact point 13x is determined by the position on the X axis of the point of contact between surfaces 12c and 11c on sheets 12 and 11, respectively. Variable contact point 13y represents the Y coordinate of the point of contact between surfaces of 12c and 11c. By varying the particular positions on the X and Y axes at which contact is made between the two sheets 12 and 11 the contact positions of points 13x and 13y of variable resistors R(X) and R(Y) are varied.

Figure 3:
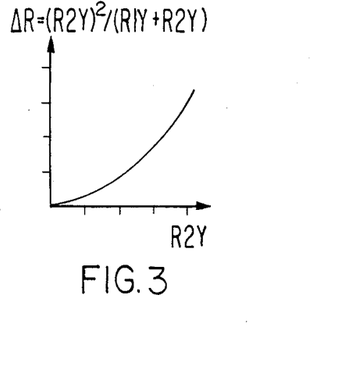
FIG. 3 is a graph illustrating the reduction in impedance of the input resistance of the conductive sheet used as the input impedance to operational amplifier 34 in accordance with this invention.
Figure 5A:
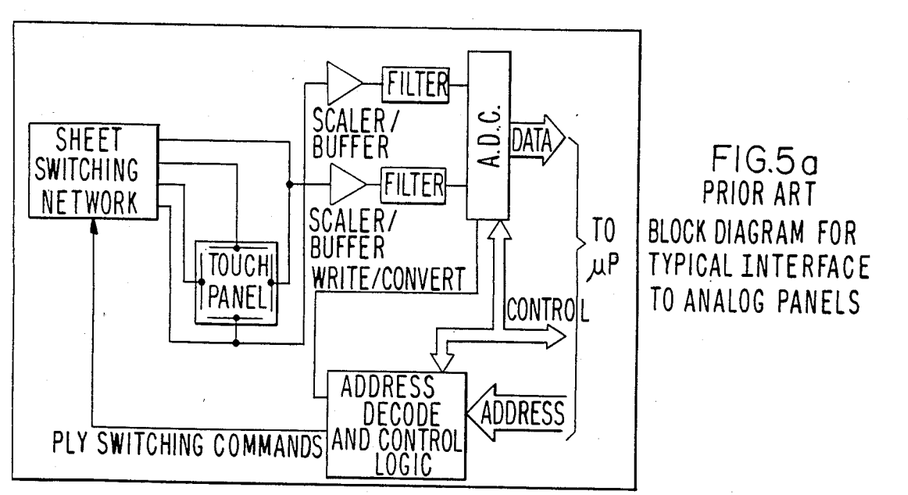
FIGS. 5a through 5d illustrate structure of the prior art to measure the X and Y coordinates of the contact point.
Figure 5B:
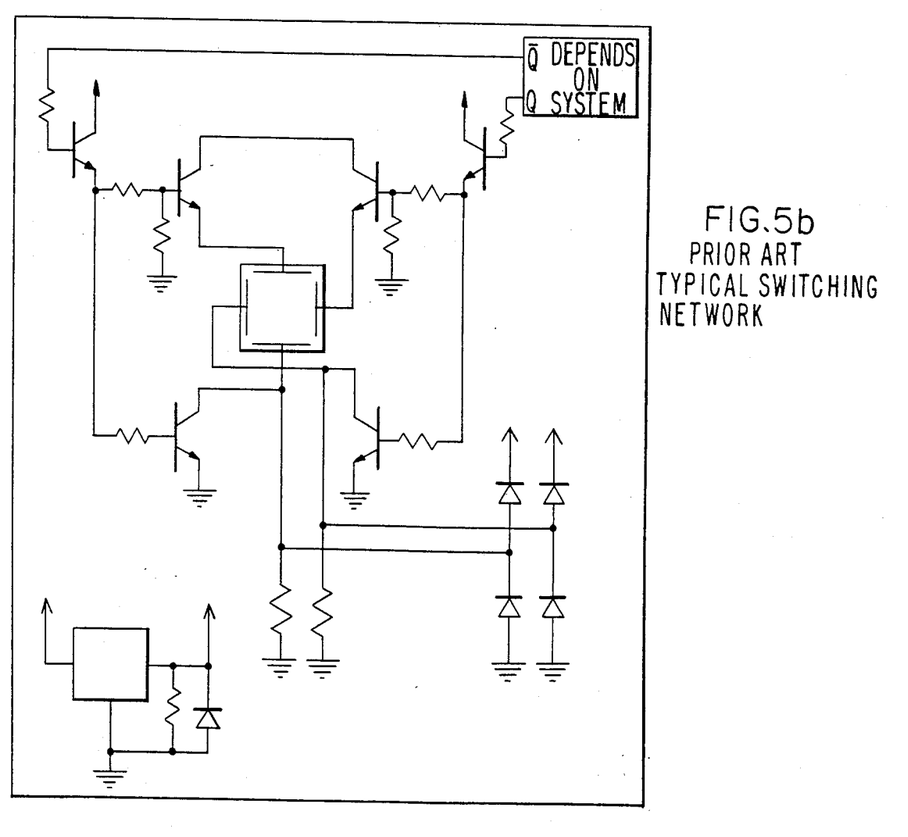
Figure 5C:
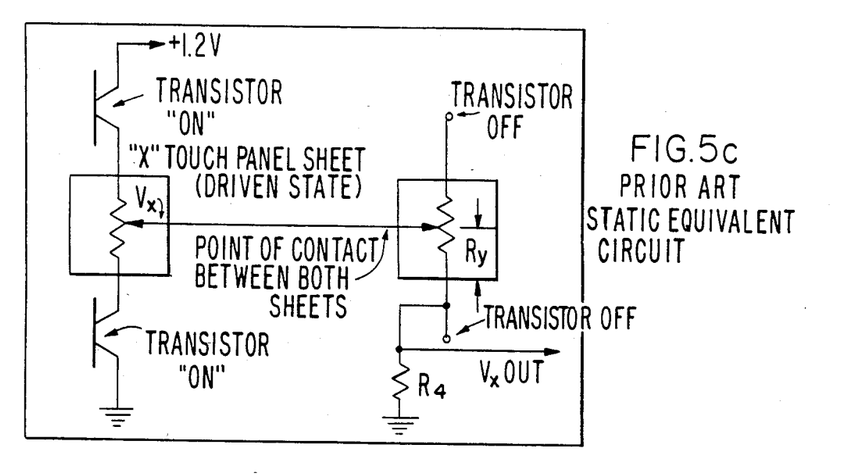
Figure 5D:
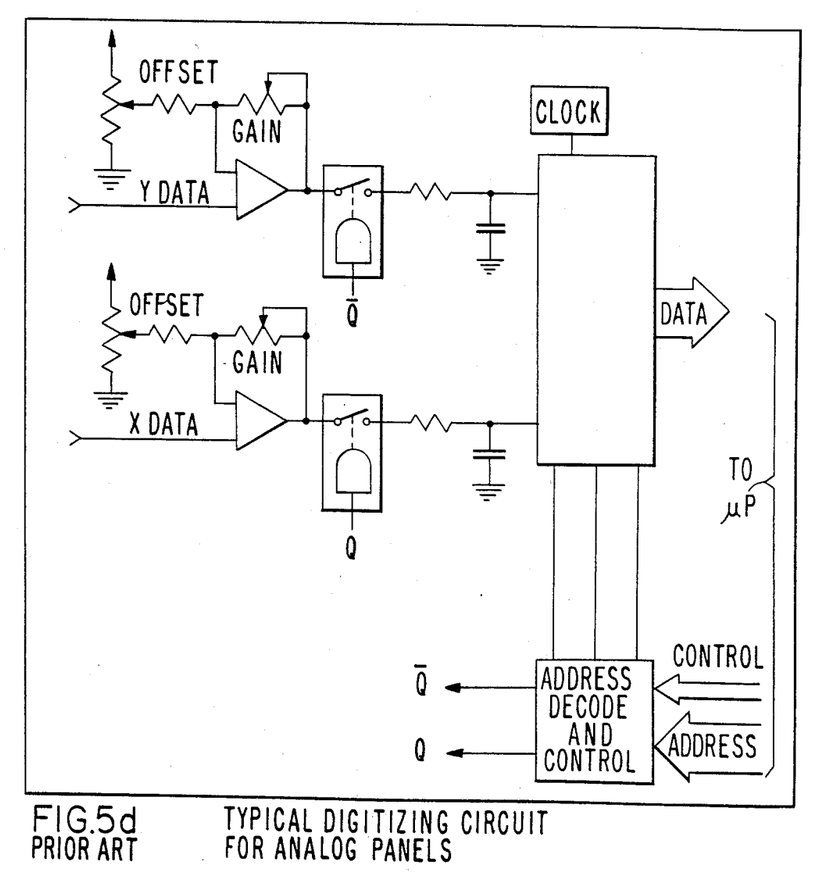

When switch 13 is closed (switch 13 is shown as open but will be closed in response to a user pressing resistive material 12c into contact with the resistive material 11c) a voltage representative of the X coordinate of the contact point is sensed and is transmitted through resistor R(Y) which is connected at both ends 11a and 11b to the input to operational amplifier 34. Operational amplifier 34 is selected to have a very large impedance $R_3$ relative to the impedance of R(X) and the parallel resistors R(Y). Of interest, while the prior art (FIGS. 5a to 5d and particularly FIG. 5c) discloses a circuit similar to that illustrated here, applicants reduce the error in the measurement by using in parallel both components of resistor R(Y) rather than only one component as illustrated in FIG. 5c (prior art). The amount of the reduction $\Delta R$ increases as the value of R(Y) increases. FIG. 3 illustrates this reduction $\Delta R$ in the impedance of R(Y) as a function of the Y coordinate of the contact point when the X coordinate is being sensed. An identical curve applies when the Y coordinate is being sensed. This reduction in impedance is given by the quadratic function $\Delta R = (R2Y)^2/(R1Y + R2Y)$ where $R1Y + R2Y$ is a constant and R2Y is that portion of the impedance contributed by R(Y) to the sensing circuit of the prior art structure and shown as R(Y) in FIG. 5c.

The impedance $R_3$ of amplifier 34 is typically on the order of $10^6$ ohms whereas the impedance of R(Y) is on the order of under a thousand ohms and typically five hundred ohms or less. The impedance of each of conductive bars 11a, 11b, 12a and 12b is typically on the order of 0.1 ohms or less.

Analog to digital convertor 35, which in the preferred embodiment comprises the well known ADC0804 manufactured by National Semiconductor, converts the analog output signal from linear amplifier 34 into a digital signal representative of the X coordinate of the contact point between conductive sheets 11c and 12c.

Figure 4:
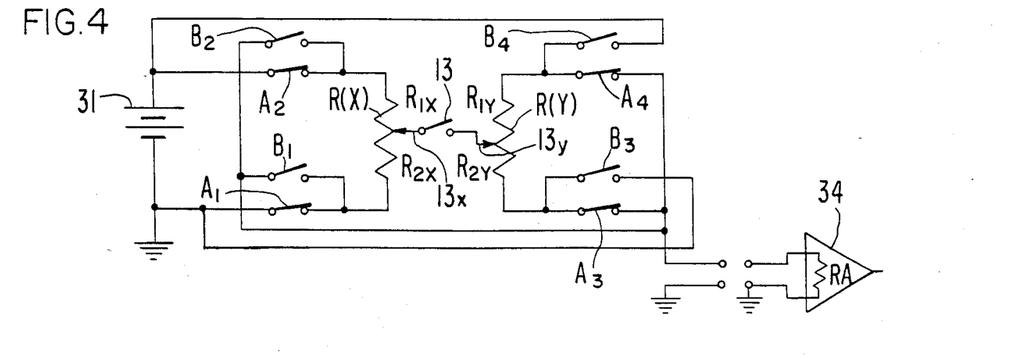
FIG. 4 illustrates schematically the circuitry used to allow the two sheets to yield in sequence the X coordinate and the Y coordinate of the contact point between the two sheets.

The circuitry of FIG. 4 implements the structure of this invention. The structure shown in FIG. 2b has been described for the determination of the X coordinate of the contact point between resistive areas 11c and 12c on sheets 11 and 12. The measurement of the Y coordinate reverses the procedure and connects the input lead of operational amplifier 34 to both ends of resistor R(X) rather than to both ends of resistor R(Y). The output signal from operational amplifier 34 then represents the Y coordinate of the contact point between resistive areas 11c and 12c of sheets 11 and 12. FIG. 4 illustrates the circuitry by which this is done. In FIG. 4 similar components of the circuit are numbered identically to the numbering in FIG. 2b. Battery 31 is shown as being connected to the resistor R(X) to provide a current through this resistor which is used to measure the X coordinate. The switches denotes $A_1$, $A_2$, $A_3$ and $A_4$ are shown as closed to allow the x coordinate of the contact point to be measured. The switches B1, B2, B3 and B4 as shown as open. As shown by the connections of FIG. 4, battery 31 is thus connected across resistor R(X). The switch 13 is shown as open but will be closed upon pressing resistive surface 11c into contact with resistive surface 12c. The contact 13x represents the X coordinate of the contact point between the two sheets 11 and 12. The ends of resistor R(Y) are connected by means of switches $A_3$ and $A_4$ to the input lead of linear amplifier 34 which thereby produces an output signal representative of the "X" coordinate of the contact point between sheets 11 and 12. When it is desired to measure the "Y" coordinate of this point, switches $A_1$ through $A_4$ are opened and switches $B_1$ through $B_4$ are closed thereby to connect battery 31 across the ends of resistor R(Y). Resistor R(Y) then serves as the sensor element to conduct the signal representative of the Y coordinate of the contact point from lead 13y to the input lead of linear amplifier 34. Thus the Y coordinate of the contact point between sheets 11c and 12c is determined in a manner analogous to the determination of the X coordinate of this contact point. The analog-to-digital converter 34 provides a digital output signal representative of this Y coordinate. Naturally, the subsequent closure of the A switches and the opening of the B switches results in another measurement of the X coordinate. Because the switches A and B are alternately and sequentially opened and closed, the system can determine in sequence the X and Y coordinates of the contact point and provide signals representative of these X and Y coordinates to external circuitry for use by such circuitry.

The above structure has the advantage that information is obtained representative of the centroid of the contact area rather than quantized information as in the prior art. Furthermore, by shorting together both bus bars on the sensor sheet (ie. the sensor sheet is sheet 11 comprising R(Y) when the X coordinate is being measured and is sheet 12 comprising R(X) when the Y coordinate is being measured) a lower noise connection is achieved. The drop in sensor sheet impedance obtained by shorting both bus bars together on the sensor sheet compared to the prior art configuration is shown in FIG. 3 as a function of R2Y, the prior art portion of R(Y) which is included in the sensing circuit when the X coordinate is being measured. Gross changes in position are detected by the system by the operator moving his or her finger along the touch tablet thereby changing the contact point and fine corrections are made by rotating the finger. Because the input impedance to the amplifier due to the parallel connection of this invention is at most one-half the value of the resistors R(X) or R(Y) or less, the effective noise into the amplifier 34 is reduced. Furthermore terminating the contacts 11a, 11b, 12a and 12b (FIG. 1) into a low impedance reduces the noise and RF interference with the system.

Figure 6:
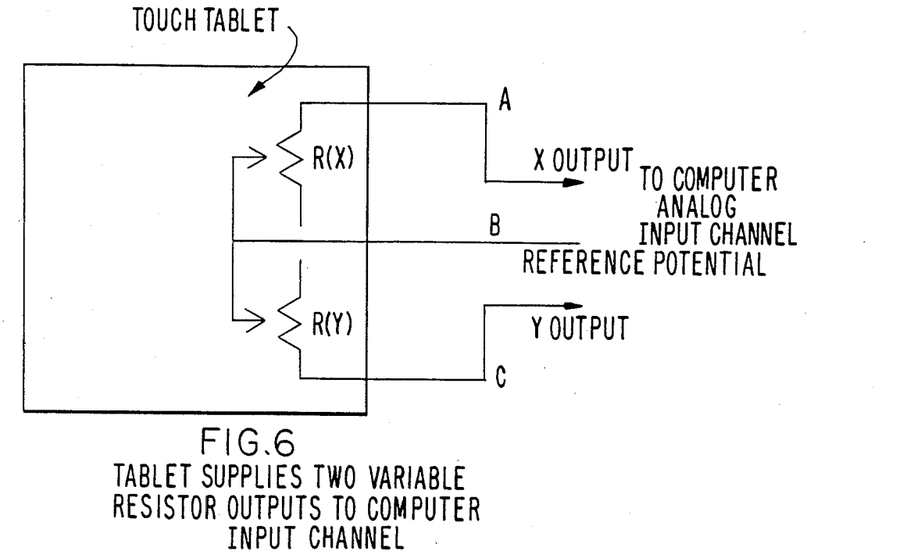
FIG. 6 shows the simplified electronic circuitry for an alternative embodiment of this invention.

Turning now to FIGS. 6 through 9 an alternative embodiment of this invention is illustrated. In FIG. 6, the electrical schematic for a touch tablet which will provide both X and Y coordinates but in a manner not requiring the switches A1 through A4 and B1 through B4 as illustrated in FIG. 4 is shown. In FIG. 6 the positive voltage is applied to one input terminal of each of resistors R(X) and R(Y). A single common is provided as shown. The tablet supplies two voltages proportional to two variable resistor outputs to a computer input channel to be processed in any one of several different ways. The particular coordinate being measured again must be sequenced in time so that first one coordinate such as Y is sampled and then the other coordinate such as X is sampled.

Figure 7:
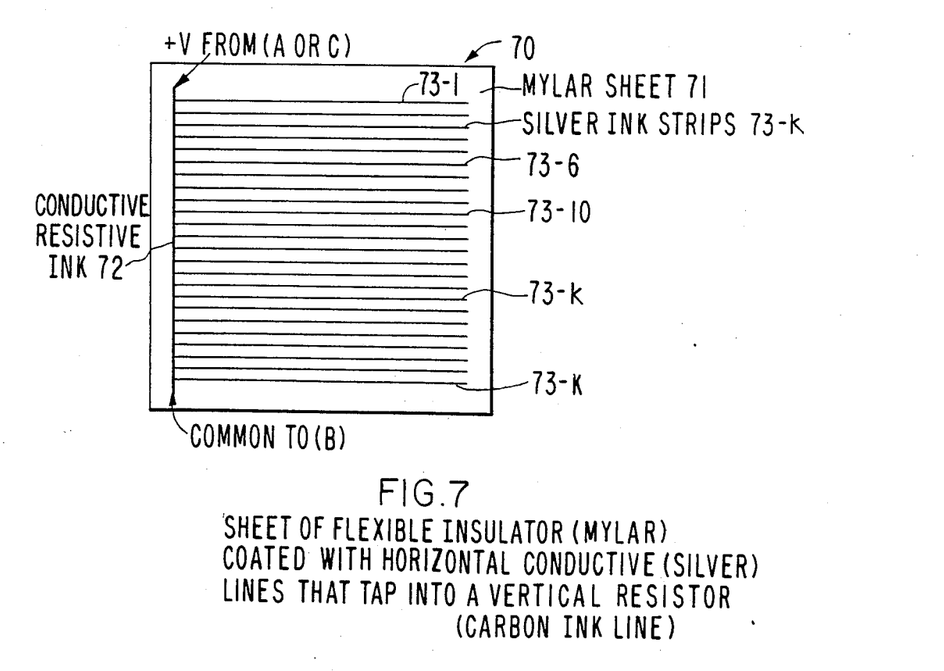
FIG. 7 shows a sheet of flexible insulator coated with horizontal conductive lines that connect into a vertical resistor for use in determining one coordinate of a contact point on a touch tablet in accordance with an alternative embodiment of this invention.

A portion of the structure used to implement the tablet of FIG. 6 is shown in FIG. 7. In FIG. 7 a sheet 71 of a flexible insulator material such as Mylar is coated with horizontal conductive lines 73-1 through 73-K where K is a selected integer and k is defined as $1 \leq k \leq K$. Lines 73-1 through 73-K tap into and are electrically connected to a vertical resistor line 72. Lines 73-1 through 73-K are formed of conductive silver in one embodiment and vertical resistor 72 is formed of a conductive resistive ink. Typical inks appropriate for use in this invention are generally well known. One end of vertical resistor 72 is connected to a positive voltage source and the other end of vertical resistor 72 is connected to ground or common. Horizontal conductive lines 73-1 through 73-K are each equipotential but are electrically separated from the adjacent lines except to the extent that each contacts a separate point on conductive resistor 72. The resolution achievable by this structure depends on the distance from line 73-k to line 73-(k+1). In operation conductive resistor 72 typically is used as one part of an RC circuit which provides a time constant for the operation of a time interval measuring circuit.

Figure 8:
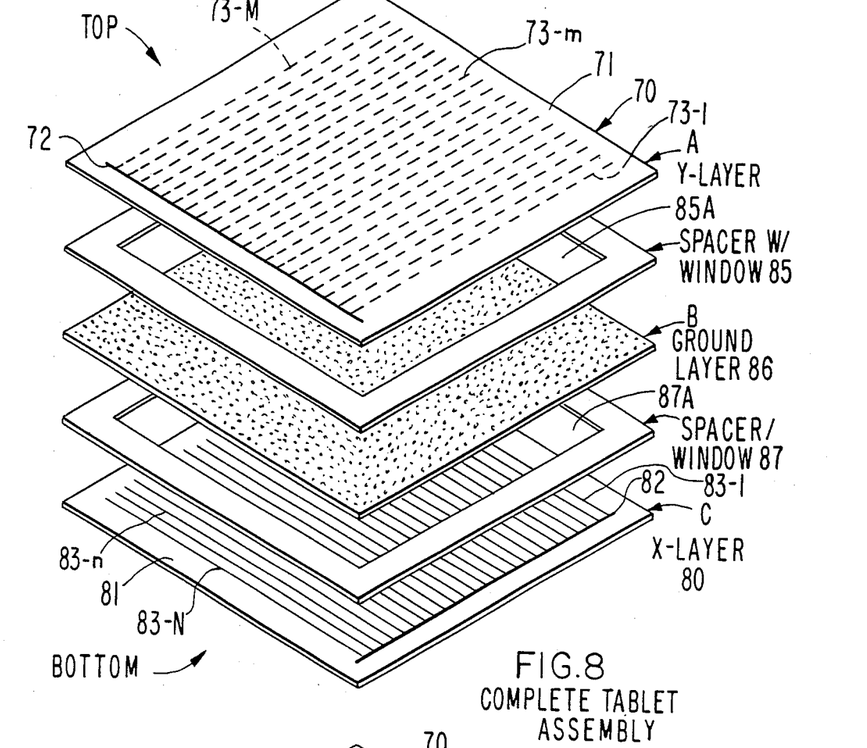
FIG. 8 illustrates in an exploded view the components for a complete touch tablet assembly in accordance with the alternative embodiment of this invention partially illustrated in FIG. 7.

FIG. 8 shows an exploded view of the material of FIG. 7 incorporated into a complete tablet assembly in accordance with this invention. The structure of FIG. 8 comprises a first sheet of Mylar 70 on which have been formed conductive lines 73-1 through 73-M, (where m is $1 \leq m \leq M$ and M is a selected integer), tapped into vertical resistor 72. Resistor 72 is of a material such as to achieve a substantial voltage drop from one end to the other end of resistive material 72. Underlying sheet 70 is a spacer 85 comprising a square ring with a central portion 85a left open. Spacer 85 is formed of an insulating material. Beneath spacer 85 is a ground layer 86 which comprises a conductive sheet capable of being at a substantially equal potential at all points. Beneath ground layer 86 is a second spacer 87 with a window 87A formed in the middle thereof. Again spacer 87 is square in shape and forms a square ring capable of maintaining separation between ground layer 86 and the bottom layer 80 of the structure of this invention. Bottom layer 80 comprises a sheet identical in structure to layer 70 except that conductive lines 83-1 through 83-N are orthogonal to conductive lines 73-1 through 73-M formed on Mylar sheet 70. Vertical resistor 82 contacts one end of each of conductive lines 83-1 through 83-N and both conductive lines 83 and vertical resistor 82 are formed upon a Mylar substrate 81. As shown in FIG. 8, sheet 80 together with the conductive lines 83-1 through 83-N measures the X coordinate of a contact point while sheet 70 together with conductive lines 73-1 through 73-M measures the Y coordinate of this point. The resulting assembly can provide a direct measure simultaneously of both the X and the Y coordinates of a contact point. Should it be desired to minimize expense and use only one linear amplifier 34 of the type shown in FIG. 2b, the coordinates of the contact point can be measured in sequence.

Figure 9:
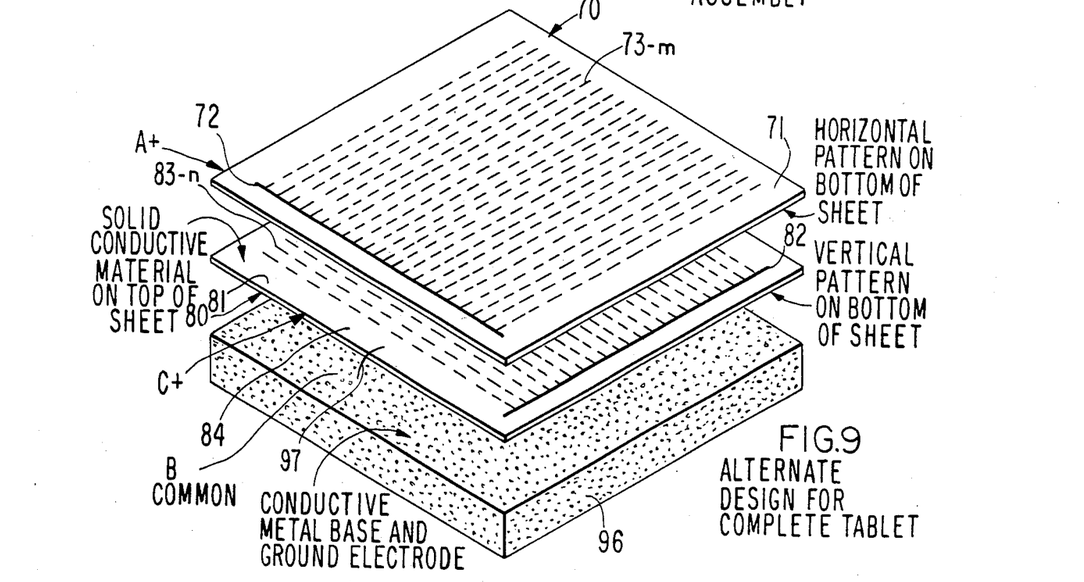
FIG. 9 illustrates still another alternative embodiment of this invention.

FIG. 9 shows an alternate design for the touch tablet of the type shown in FIG. 8. In FIG. 9, sheets 70 and 80 are as shown in FIG. 8 except that sheet 80 has formed on the top surface thereof a conductive plane 81 which is electrically connected 97 to the conductive metal base and ground electrode 96. The vertical pattern on sheet 80 and the horizontal pattern on sheet 70 are formed precisely as described above in conjunction with FIG. 8. However, an insulating spacer (not shown) such as spacer 85 or spacer 87 as shown in FIG. 8 is placed between sheet 80 and sheet 70. Upon pressing upon sheet 70, the user forces a particular line 73-m on conductive sheet 70 into contact with the ground plane or conductive layer on the top side of sheet 80 and forces a particular one 83-n of conductive lines 83-1 through 83-N formed on the bottom surface of sheet 80 into contact with the underlying ground plane 96. Accordingly, the X and the Y coordinates of the contact point are again determined but in this case simultaneously if desired, depending upon whether one or two readout circuits of the type shown in FIG. 2b are used. The structures of FIGS. 6, 7, 8, and 9 have the advantage of not requiring ancillary circuitry of the type shown in FIG. 4 because these structures generate resistance values that vary in response to the motion of the user's finger or stylus on the tablet surface. These structures thus provide certain cost advantages over more complex tablets. The structure basically comprises two variable resistors which determine the X and Y coordinates of the contact point of the user on the touch tablet. Note that the spacing between the lines 73-1 through 73-M and 83-1 through 83-N determines the resolution achievable with this invention.

The resolution can be doubled by adding logic circuitry to detect the contact of two adjacent conductive lines rather than merely one line. When two adjacent conductive lines are contacted as is known in the prior art the average location of contact can be assumed to be equidistant between the two lines. By having different numbers and spacings of lines for the X coordinate as opposed to the Y coordinate, the resolution of the tablet can be varied from one axis to the other.

The resistive material shown as lines 72 and 82 is of such composition and dimension that the overall resistance of the strip is equal to the largest value obtained with the potentiometers otherwise used with prior art computer systems. If, by means of example, the computer system is designed for use with a 500,0000 ohm potentiometer, and the resistive strip is prepared from a silk screen graphite-based ink with a resistance of 5,000 ohms per square, this resistive strip would have to have an aspect ratio of 100 to 1 in order to generate the required resistance value.

The sheets shown as Mylar can also be formed of any other thin flexible insulating plastic or equivalent material. The sheets such as sheets 70 and 80 may be prepared by any number of methods including, but not limited to, silk screening, vapor deposition or lamination.

The ground sheet 86 illustrated in FIG. 8 can be formed of an insulating layer on which are formed two conductive surfaces. one to be contacted by the conductive leads on the top insulating layer 70 and the other to be contacted by the conductive leads on the bottom insulating layer 80. Alternatively, this ground sheet can comprise a single conductive layer of material.

The sheets 70 and 80 shown in FIG. 8 and the corresponding sheets 70 and 80 shown in FIG. 9 are arranged with relation to thin spacers so that when not pressed they are held apart from each other by tension. As the surface of one sheet is pressed with a finger or other appropriate implement, the point of contact is sufficiently pressed to bring both sheets in contact with the conductive sheet. This effectively creates two separate resistance values in accordance with the schematics shown in FIG. 6. Thus the structure shown in FIG. 8 and also the structure shown in FIG. 9 are appropriate input devices for a computer system.

As a finger is moved along one axis of the structure of FIG. 8 or FIG. 9, the resistance of one sheet will change in response to finger position while the other will remain substantially constant. When the finger is moved along the other axis the resistance variations described above will switch axis as expected.

Because the use of three flexible layers is an added expense and because each tablet typically requires a rigid backing plate, the alternative configuration for the tablet depicted in FIG. 9 has certain advantages. The tablet of FIG. 9 is built from a first sheet with conductive bars and resistive strip, a second sheet of the first kind with its surface adjacent to the conductive paths on the first sheet provided with a uniform, highly conductive coating and a rigid metal base of noncorrosive highly conductive material such as stainless steel. Both flexible sheets are arranged in a spaced-apart configuration when not being touched. Finger pressure brings all surfaces into contact at a point to generate two resistance values with the characteristics previously described in conjunction with the structure of FIG. 8, for example.

While numerous manufacturing techniques are appropriate for the manufacture of the structures described above, the tablets of this invention are particularly suited to be manufactured using low cost screen printing techniques normally associated with membrane keyboard technology. While the invention has been described in conjunction with three embodiments, it should be understood that other embodiments of this invention will be obvious to those skilled in the art in view of the above disclosure. The above disclosure is meant to be illustrative and not limiting.

What is claimed is:

1. Data entry structure comprising
   a first sheet of insulating material having a first surface and a second surface;
   a second sheet of insulating material having a first surface and a second surface;
   a first plurality of conductive strips formed on the first surface of said first sheet of insulating material;
   a first resistive strip formed in contact with, and so as to connect, one end of each of said first plurality of conductive strips on said first surface of said first sheet of insulating material;
   a second plurality of conductive strips formed on the first surface of said second sheet of insulating material;
   a second resistive strip formed in contact with, and so as to connect, one end of each of said second plurality of conductive strips on said first surface of said second sheet of insulating material;
   a conductive layer formed on said second surface of said second sheet of insulating material;
   a third sheet of conductive material;
   means for orienting said first sheet of insulating material, said second sheet of insulating material and said third sheet of conductive material such that each sheet is spaced apart from each other and the first plurality of conductive strips formed on said first surface of said first sheet of insulating material face the the conductive layer formed on the second surface of said second sheet of insulating material, said second plurality of conductive strips face said third sheet of conductive material, such that by pressing a selected point on said structure, a selected one or two of said first plurality of conductive strips come into contact with the conductive layer formed on said second surface of said second sheet of insulating material and a selected one or two of said second plurality of conductive strips come into contact with the third sheet of conductive material, thereby to determine a first coordinate of the point of contact and a second coordinate orthogonal to said first coordinate of said point of contact.

2. Structure as in claim 1 where
said first strip of resistive material comprises a first potentiometer;
said second strip of resistive material comprises a second potentiometer; and including
means for determining the current through said first strip of resistive material and the current through said second strip of resistive material, thereby to determine the first coordinate of said point of contact and the second coordinate orthogonal to said first coordinate of said point of contact.

* * * * *